United States Patent [19]

Corbett

[11] Patent Number: 4,771,744
[45] Date of Patent: Sep. 20, 1988

[54] CONNECTING ROD WITH HYDRODYNAMIC BEARING

[75] Inventor: William D. Corbett, Fond du Lac, Wis.

[73] Assignee: Brunswick Corporation, Skokie, Ill.

[21] Appl. No.: 103,061

[22] Filed: Sep. 30, 1987

[51] Int. Cl.4 .............................................. F01M 1/00
[52] U.S. Cl. .................................. 123/196 W; 74/583; 384/123
[58] Field of Search ................ 123/197 AB, 197 AC, 123/196 W, 196 R, 73 AD; 74/579 E, 583, 587; 384/123

[56] References Cited

U.S. PATENT DOCUMENTS

| | | |
|---|---|---|
| 775,923 | 11/1904 | Holmes . |
| 2,333,524 | 11/1943 | Conover et al. ............... 123/196 W |
| 2,570,682 | 10/1951 | Imbert .................... 384/123 |
| 2,628,136 | 2/1953 | Pittman . |
| 3,144,786 | 8/1964 | Dale . |
| 3,376,083 | 4/1968 | Muijderman . |
| 3,663,074 | 5/1972 | Fernlund et al. . |
| 3,752,542 | 8/1973 | Kraus . |
| 3,841,720 | 10/1974 | Kovach . |
| 3,870,382 | 3/1975 | Reinhoudt . |
| 3,975,122 | 8/1976 | Hackbarth et al. . |
| 4,007,974 | 2/1977 | Huber . |
| 4,035,112 | 7/1977 | Hackbarth et al. . |
| 4,244,332 | 1/1981 | Kusche et al. . |
| 4,305,351 | 12/1981 | Staerzl . |
| 4,436,443 | 3/1984 | McCormick . |
| 4,512,292 | 4/1985 | Hundertmark ............... 123/196 W |
| 4,598,672 | 7/1986 | Jayne et al. .................... 123/56 BC |
| 4,611,559 | 9/1986 | Sumigawa .................... 123/196 W |
| 4,639,148 | 1/1987 | Tamura et al. ...................... 384/123 |

FOREIGN PATENT DOCUMENTS

| | | |
|---|---|---|
| 0165017 | 7/1986 | Japan ................................. 384/123 |
| 0165016 | 7/1986 | Japan ................................. 384/123 |

*Primary Examiner*—Charles J. Myhre
*Assistant Examiner*—David A. Okonsky
*Attorney, Agent, or Firm*—Andrus, Sceales, Starke & Sawall

[57] ABSTRACT

In a two cycle internal combustion engine (2), the sidefaces (60, 62) of the connecting rod (40) have grooves (64) formed therein dragging lubricant from the fuel-air-lubricant mixture in the crankcase (8) along the crankfaces (38, 40) of the crankarm discs (34, 36) of the crankshaft (24), providing a hydrodynamic bearing with a layer of lubricant separating the sidefaces of the connecting rod from the crankfaces of the crankarm discs such that the sidefaces of the connecting rod ride on a layer of lubricant, and eliminating the need to silver plate the sidefaces of the connecting rod.

6 Claims, 2 Drawing Sheets

FIG. 3
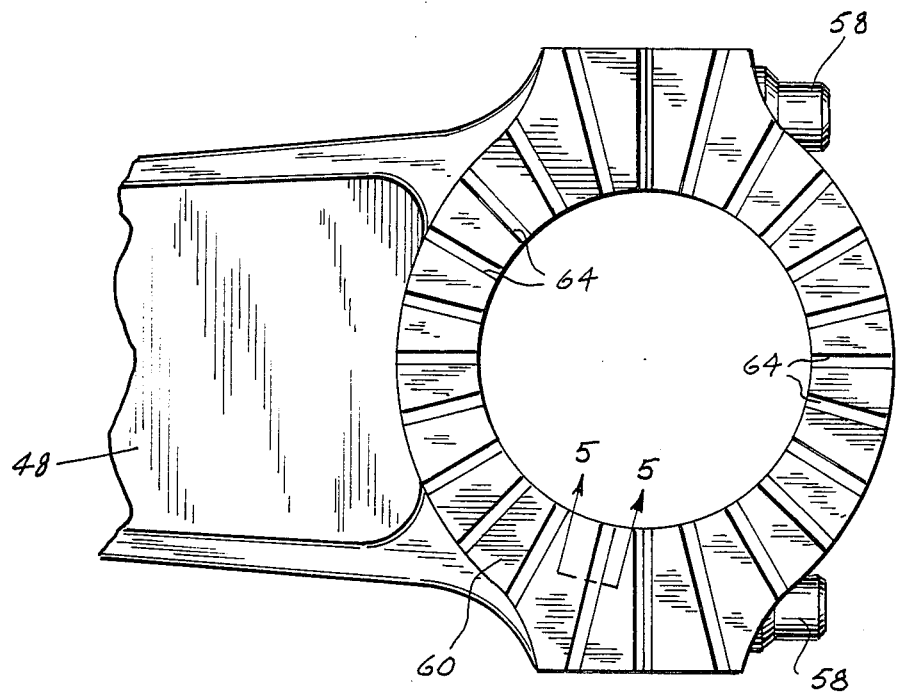
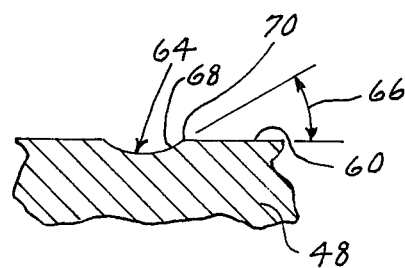
FIG. 4
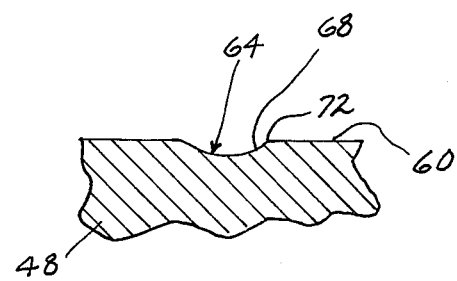
FIG. 5

CONNECTING ROD WITH HYDRODYNAMIC BEARING

BACKGROUND AND SUMMARY

The invention relates to connecting rods for two cycle internal combustion engines.

In two cycle internal combustion engines, the side faces of the connecting rods at their crank ends are typically silver plated to bear the frictional rubbing contact with the crankarms or discs of the crankshaft. The expense of silver plating is objectionable.

The present invention eliminates the need to silver plate the side faces of the connecting rods. In the present invention, grooves or reliefs are cut on the side faces of the connecting rod, with a very low angle to the side face, and with radiused corners, to provide a hydrodynamic bearing and allow the side face of the connecting rod to ride on a layer of lubricant.

BRIEF DESCRIPTION OF THE DRAWINGS

FIG. 3 is an enlarged end view of a portion of the connecting rod of FIG. 2.

FIG. 4 is a sectional view taken along line 5—5 of FIG. 3 prior to buffing.

FIG. 5 is a sectional view taken along 5—5 of FIG. 3.

DETAILED DESCRIPTION PRIOR ART

Figure 1:
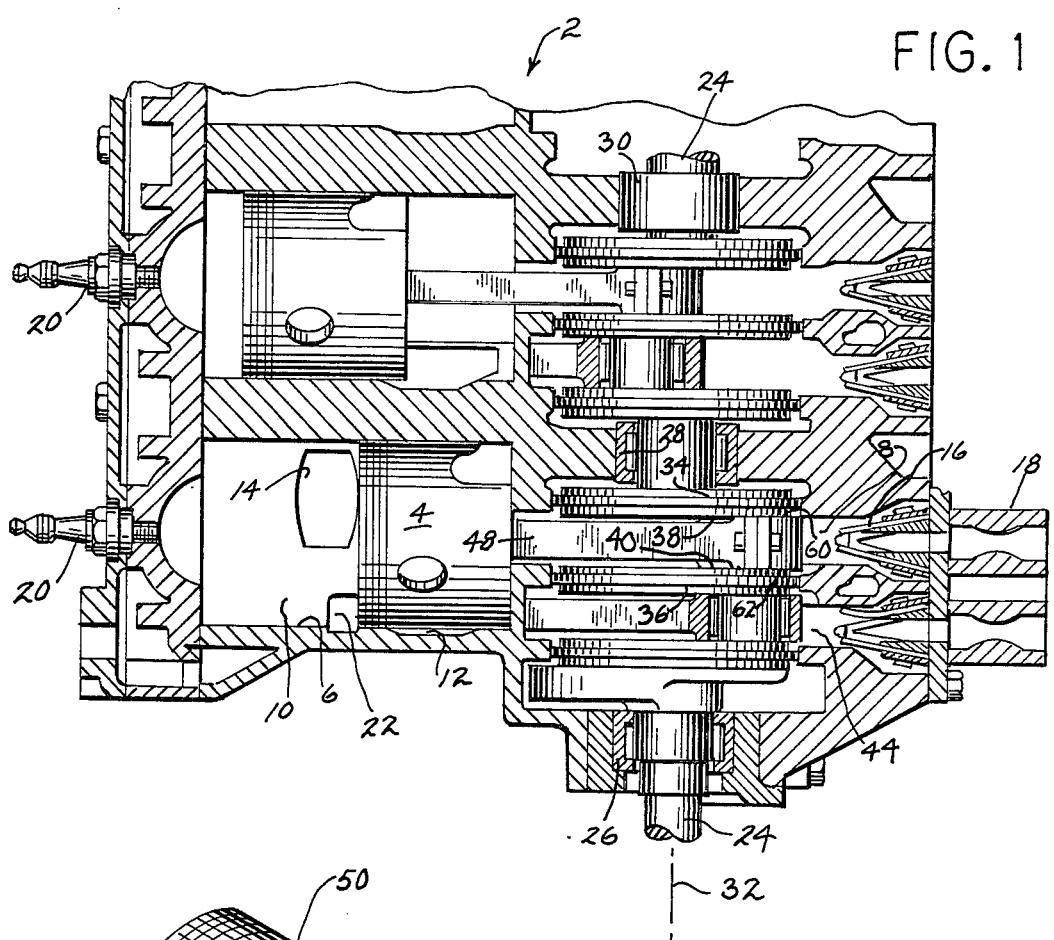
FIG. 1 is a sectional view of a two cycle internal combustion engine.

FIG. 1 shows a two cycle internal combustion engine 2 having a plurality of pistons 4 each reciprocal in a cylinder 6 between a crankcase chamber 8 and a combustion chamber 10. Crankcase chamber 8 contains a fuel-air-lubricant mixture for lubricating the engine and for supplying a combustible mixture through transfer passage 12 and intake port 14 to combustion chamber 10. The mixture is supplied to crankcase chamber 8 through one-way reed valves 16 from a carburetor, schematically shown at 18, or by means of fuel injection. FIG. 1 shows a portion of one bank of cylinders in a V-engine, for which further reference may be had to Kusche et al U.S. Pat. No. 4,244,332, Staerzl U.S. Pat. No. 4,305,351, and Hensel et al allowed U.S. patent application Ser. No. 900,595, filed Aug. 26, 1986 and now U.S. Pat. No. 4,702,202, incorporated herein by reference. The present invention has broad application to various types of two cycle engines having a lubricant mixture in the crankcase.

Piston 4 moves to the left during its intake stroke, drawing a fuel-air-lubricant mixture through one-way reed valves 16 into crankcase chamber 8. Piston movement to the left also compresses the mixture in combustion chamber 10 for ignition by spark plug 20, which combustion drives piston 4 to the right, generating its power stroke. During movement of piston 4 to the right, the mixture in crankcase chamber 8 is blocked by one-way reed valves 16 from exiting the crankcase, and instead is driven through transfer passage 12 to intake port 14 in combustion chamber 10 for compression during the intake stroke, and so on to repeat the cycle, all as is well known. The combustion products are exhausted at port 22.

The engine has a crankshaft 24 rotatably journaled therein at main bearings 26, 28, 30 and so on, along a crankshaft center line 32. Crankshaft 24 has a plurality of sealing discs such as 34 and 36 which separate and isolate adjacent crankcase chambers and which also provide crankarms having facing crankfaces such as 38 and 40. Crankarm disc 36 has an outer circumferential seal ring 42, FIG. 2, separating and isolating crankcase chamber 8 from crankcase chamber 44, as standard in the art. Crankarm discs 34 and 36 extend radially outwardly from crankshaft center line 32.

Figure 2:
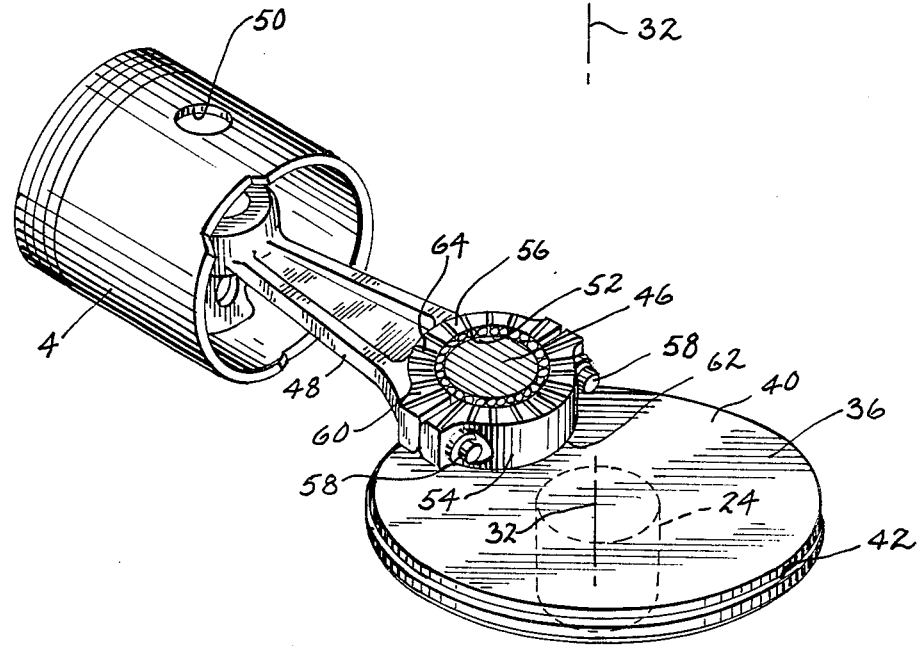
FIG. 2 is a perspective view of a connecting rod in accordance with the invention.

A crank pin 46, FIG. 2, extends axially between crankarms 34 and 36 integrally and perpendicularly from crankfaces 38 and 40 and parallel to and eccentrically offset from center line 32. Piston 4 has a connecting rod 48 having a left end rotatably journaled to the piston by piston pin 50, and having a right end rotatably journaled on crankpin 46, with roller or needle bearings 52 if desired, for which further reference may be had to McCormick U.S. Pat. No. 4,436,443, incorporated herein by reference. The connecting rod has an end cap 54 mounted to saddle portion 56 by bolts 58.

Connecting rod 48 has sidefaces 60 and 62 engaging respective crankfaces 38 and 40 of respective crankarm discs 34 and 36. Because of the rotary frictional rubbing of the surfaces, sidefaces 60 and 62 of the connecting rod are typically silver plated.

PRESENT INVENTION

In the present invention, sidefaces 60 and 62 of the connecting rod have grooves 64 formed therein, FIGS. 2 and 3. The grooves drag lubricant from the fuel-air-lubricant mixture in crankcase chamber 8 along crankfaces 38 and 40 of crankarm discs 34 and 36, and provide a hydrodynamic bearing with a layer of lubricant separating sidefaces 60 and 62 of connecting rod 48 from crankfaces 38 and 40 of crankarm discs 34 and 36. Sidefaces 60 and 62 of connecting rod 48 ride on a layer of lubricant in the mixture. This eliminates the need to silver plate sidefaces 60 and 62 of connecting rod 48.

Grooves 64 extend radially outwardly relative to crankpin 46. The grooves provide a hydrodynamic bearing which bears substantially only radial loading and shearing of the lubricant film, and substantially no axial loading.

Grooves 64 are ground into the sidefaces of the connecting rod with a very low grinding profile. In the preferred embodiment, a very shallow angle 66, FIG. 4, is formed between the groove wall 68 and the connecting rod sideface 60. Angle 66 is exaggerated in FIG. 4, for illustration, but is preferably about 1.5°. After grinding, the junction 70 of groove wall 68 and connecting rod sideface 60 is buffed to provide a rounded corner 72, FIG. 5, to enhance the hydrodynamic bearing effect.

It is recognized that various equivalents, alternatives and modifications are possible within the scope of the appended claims.

I claim:

1. A two cycle internal combustion engine comprising a piston reciprocal in a cylinder between a crankcase chamber and a combustion chamber, said crankcase chamber containing a fuel-air-lubricant mixture for lubricating said engine and for supplying a combustible mixture to said combustion chamber, said engine having a crankshaft rotatably journaled therein along a crankshaft centerline, said crankshaft having a plurality of crankarms extending radially relative to said centerline, said crankarms having facing crankfaces, a crankpin extending axially between a pair of said crankarms perpendicularly from said crankfaces and parallel to and eccentrically offset from said crankshaft centerline, said piston having a connecting rod rotatably journaled on said crankpin, said connecting rod having side faces normally engaging said crankfaces of said crankarms, said side faces of said connecting rod having grooves formed therein dragging lubricant from said mixture along said crankfaces of said crankarms and providing a hydrodynamic bearing with a layer of lubricant separating said side faces of said connecting rod from said crankfaces of said crankarms such that said side faces of said connecting rod ride on a layer of lubricant in said mixture and eliminate the need to silverplate said side faces of said connecting rod, wherein the rotary motion of said crankshaft itself supplies said lubricant to said grooves without the need of an auxiliary pump for pumping lubricant to said grooves.

2. The invention according to claim 1 wherein said grooves extend radially outwardly relative to said crankpin.

3. The invention according to claim 1 wherein said grooves providing said hydrodynamic bearing bear substantially only radial loading and shearing of said film, and substantially no axial loading.

4. The invention according to claim 3 wherein each said groove is recessed into said side face of said connecting rod along a groove wall forming an angle of about 1.5° with said side face of said connecting rod.

5. The invention according to claim 4 wherein the junction of said groove wall and said side face of said connecting rod is buffed to a rounded surface.

6. The invention according to claim 1 wherein said lubricant is supplied to said grooves directly from said fuel-air-lubricant mixture in said crankcase chamber without passing through conduit passage structure through said crankshaft and without passing through conduit passage structure through said connecting rod.

* * * * *